US009571580B2

(12) United States Patent
Musial et al.

(10) Patent No.: US 9,571,580 B2
(45) Date of Patent: *Feb. 14, 2017

(54) STORAGE MANAGEMENT IN A MULTI-TIERED STORAGE ARCHITECTURE (71) Applicant: International Business Machines Corporation, Armonk, NY (US)

(72) Inventors: John G. Musial, Newburgh, NY (US); Pamela A. Nesbitt, Raleigh, NC (US); Sandeep R. Patil, Maharashtra (IN); Riyazahamad M. Shiraguppi, Maharashtra (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/090,631

(22) Filed: Apr. 5, 2016

(65) Prior Publication Data
US 2016/0216888 A1  Jul. 28, 2016

Related U.S. Application Data (63) Continuation of application No. 13/746,570, filed on Jan. 22, 2013, now Pat. No. 9,319,464.

(51) Int. Cl.
*H04L 29/08* (2006.01)
*G06F 3/06* (2006.01)
(Continued)

(52) U.S. Cl.
CPC ........... *H04L 67/1097* (2013.01); *G06F 3/061* (2013.01); *G06F 3/067* (2013.01); *G06F 3/0631* (2013.01);
(Continued)

(58) Field of Classification Search
CPC combination set(s) only.
See application file for complete search history.

(56) References Cited

U.S. PATENT DOCUMENTS 6,694,419 B1 * 2/2004 Schnee ............... G06F 9/5077
711/173
8,033,913 B2 10/2011 Cockerille et al.
(Continued)

FOREIGN PATENT DOCUMENTS

WO 2012058242 A2 5/2012

OTHER PUBLICATIONS

IBM, IPCOM000188050D, Sep. 21, 2009, Autonomic Turning of Weighting Parameters to Account for Latencies in a Dynamic Workload Management Environment, pp. 1-4.
(Continued)

*Primary Examiner* — Chris Parry
*Assistant Examiner* — Caroline Jahnige
(74) *Attorney, Agent, or Firm* — Cantor Colburn LLP; Kurt Goudy (57) ABSTRACT

An aspect of resource management includes a multi-tiered storage system and a processor communicatively coupled to the storage system. The processor is configured to execute computer readable instructions. The instructions include calculating a performance weight for each end user of an application. The performance weight is calculated as a function of a current activity level with respect to activities conducted via the application and a type of the application. The instructions also include calculating an input/output weight for each end user from a combination of an input/output requirement and the performance weight. The input/output requirement is indicative of an amount of storage resources of the multi-tiered storage system associated with anticipated activities of the end user. The instructions further
(Continued)

include allocating an amount of the storage resources for each end user that is proportioned based on the corresponding input/output weight.

10 Claims, 7 Drawing Sheets

(51) Int. Cl.
    *G06F 9/50*     (2006.01)
    *H04L 12/24*     (2006.01)

(52) U.S. Cl.
    CPC ........... *G06F 3/0647* (2013.01); *G06F 3/0649* (2013.01); *G06F 3/0685* (2013.01); *G06F 9/5016* (2013.01); *H04L 67/12* (2013.01); *H04L 67/22* (2013.01); *H04L 41/5096* (2013.01)

(56) References Cited

U.S. PATENT DOCUMENTS

| | | |
|---|---|---|
| 8,262,468 B1 | 9/2012 | Vanbragt et al. |
| 2004/0249667 A1 | 12/2004 | Oon |
| 2005/0177832 A1* | 8/2005 | Chew .................. G06F 9/44594 718/104 |
| 2006/0218285 A1* | 9/2006 | Talwar .................. G06F 9/5072 709/227 |
| 2006/0287079 A1 | 12/2006 | Nonaka et al. |
| 2010/0088117 A1 | 4/2010 | Belden et al. |
| 2011/0070944 A1 | 3/2011 | De Waal et al. |
| 2011/0197027 A1* | 8/2011 | Balasubramanian ... G06F 3/061 711/117 |
| 2012/0142429 A1* | 6/2012 | Muller .................... A63F 13/12 463/42 |

OTHER PUBLICATIONS

IBM/San Jose Center; ITSO, CICS Workload Management Using CICSPlex SM and the MVS/ESA Workload Manager, Dec. 1994; 95 pages.

U.S. Appl. No. 13/746,570; Non-Final Office Action; Date Filed: Jan. 22, 2013; Date Mailed: Jul. 10, 2015; 21 pages.

U.S. Appl. No. 14/020,167, Non-Final Office Action, Date Filed: Sep. 6, 2013; Date Mailed: Aug. 25, 2015; 27 pages.

* cited by examiner

| APPLN ID | END USER ID | DEPENDENT USER ID | OPPONENT USER ID | ACTIVITY LEVEL (0-10) | PAST % | CURRENT % |
|---|---|---|---|---|---|---|
| 1 | 1 | 2 | 3 | 4 | 30 | 30 |
| 1 | 2 | 1 | 3 | 8 | 30 | 50 |
| 1 | 3 | — | 1,2 | 5 | 40 | 20 |
| 2 | 1 | 2,3 | — | 7 | 30 | 20 |
| 2 | 2 | 1,3 | — | 2 | 50 | 40 |
| 2 | 3 | 1,2 | — | 9 | 20 | 40 |

602 — APPLN ID; 604 — END USER ID; 606 — DEPENDENT USER ID; 608 — OPPONENT USER ID; 610 — ACTIVITY LEVEL; 612 — PAST %; 614 — CURRENT %

| APPLN NAME | APPLN ID | PAST % | CURRENT % |
|---|---|---|---|
| XXXXX XXXX | 1 | 40 | 45 |
| XXXXX XXXX | 2 | 60 | 55 |

620 — APPLN NAME; 622 — APPLN ID; 624 — PAST %; 626 — CURRENT %

STORAGE MANAGEMENT IN A MULTI-TIERED STORAGE ARCHITECTURE

DOMESTIC PRIORITY

This application is a continuation of U.S. patent application Ser. No. 13/746,570, filed Jan. 22, 2013, the content of which is incorporated by reference herein in its entirety.

BACKGROUND

The present invention relates to storage management and, more specifically, to storage management in a multi-tiered storage architecture.

Multi-tiered storage is a strategic networked storage method where data is stored on various types of storage devices based primarily on variables such as, criteria of access, frequency of use, security, and data recovery requirements. For space and performance optimization, the data is then moved between high-cost and low-cost storage media. Such systems are typically implemented due to the high costs (per byte of storage) associated with high-speed storage devices, such as Solid State devices (SSD) and Hard Disk Drive Arrays, as compared with slower storage devices, such as optical discs and magnetic tape drives.

While it would be ideal for system users to have all stored data available on high-speed devices at all times, this can be prohibitively expensive for many organizations or enterprises. Thus, multi-tiered storage systems have been developed to store the bulk of the enterprise's data on slower devices, which data is then copied to faster media when needed. One advantage of these tiered systems is that the total amount of stored data can be much larger than the capacity of the active storage media available. In effect, tiered storage systems turn fast storage devices into caches for slower mass storage devices.

SUMMARY

According to an embodiment of the present invention, a system for resource management is provided. The system includes a multi-tiered storage system and a processor communicatively coupled to the multi-tiered storage system. The processor is configured to execute computer readable instructions. The computer readable instructions include calculating a performance weight for each end user of an application. The performance weight is calculated as a function of a current activity level of each end user with respect to activities conducted via the application and a type of the application. The application is typed with a static value that indicates an average amount of storage resources in the multi-tiered storage system used by the application. The instructions also include calculating an input/output weight for each end user from a combination of an input/output requirement and the performance weight. The input/output requirement is indicative of an amount of storage resources of the multi-tiered storage system associated with anticipated activities of the end user. The instructions further include allocating an amount of the storage resources for each end user that is proportioned based on the corresponding input/output weight.

According to another embodiment of the present invention, a method is provided. The method includes calculating a performance weight for each end user of an application executing on a computer processor. The performance weight is calculated as a function of an activity level determined for each end user and a type of the application. The method also includes calculating an input/output weight for each end user from a combination of an input/output requirement and the performance weight. The input/output requirement is indicative of an amount of storage resources of a multi-tiered storage system associated with anticipated activities of the end user. The method further includes assigning an amount of the storage resources for each end user based on the input/output weight.

According to a further embodiment of the present invention, a computer program product is provided. The computer program product includes a computer-readable storage medium having instructions embodied thereon, which when executed by a computer, causes the computer to implement a method. The method includes calculating a performance weight for each end user of an application executing on a computer processor. The performance weight is calculated as a function of an activity level determined for each end user and a type of the application. The method also includes calculating an input/output weight for each end user from a combination of an input/output requirement and the performance weight. The input/output requirement is indicative of an amount of storage resources of a multi-tiered storage system associated with anticipated activities of the end user. The method further includes assigning an amount of the storage resources for each end user based on the input/output weight.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In a multi-tiered storage system, resource management processes are provided. The resource management processes provide intelligent allocation of resources to client devices that access one or more applications hosted by a host computer, whereby the allocation is based on variables, such as client profile information, end user activity levels, and dynamically-changing input/output requirements of each of the end users. The resource management processes monitor activities conducted by the end users and use values provided by the above-referenced variables to calculate a proportionate, weighted distribution of resources to the end users.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
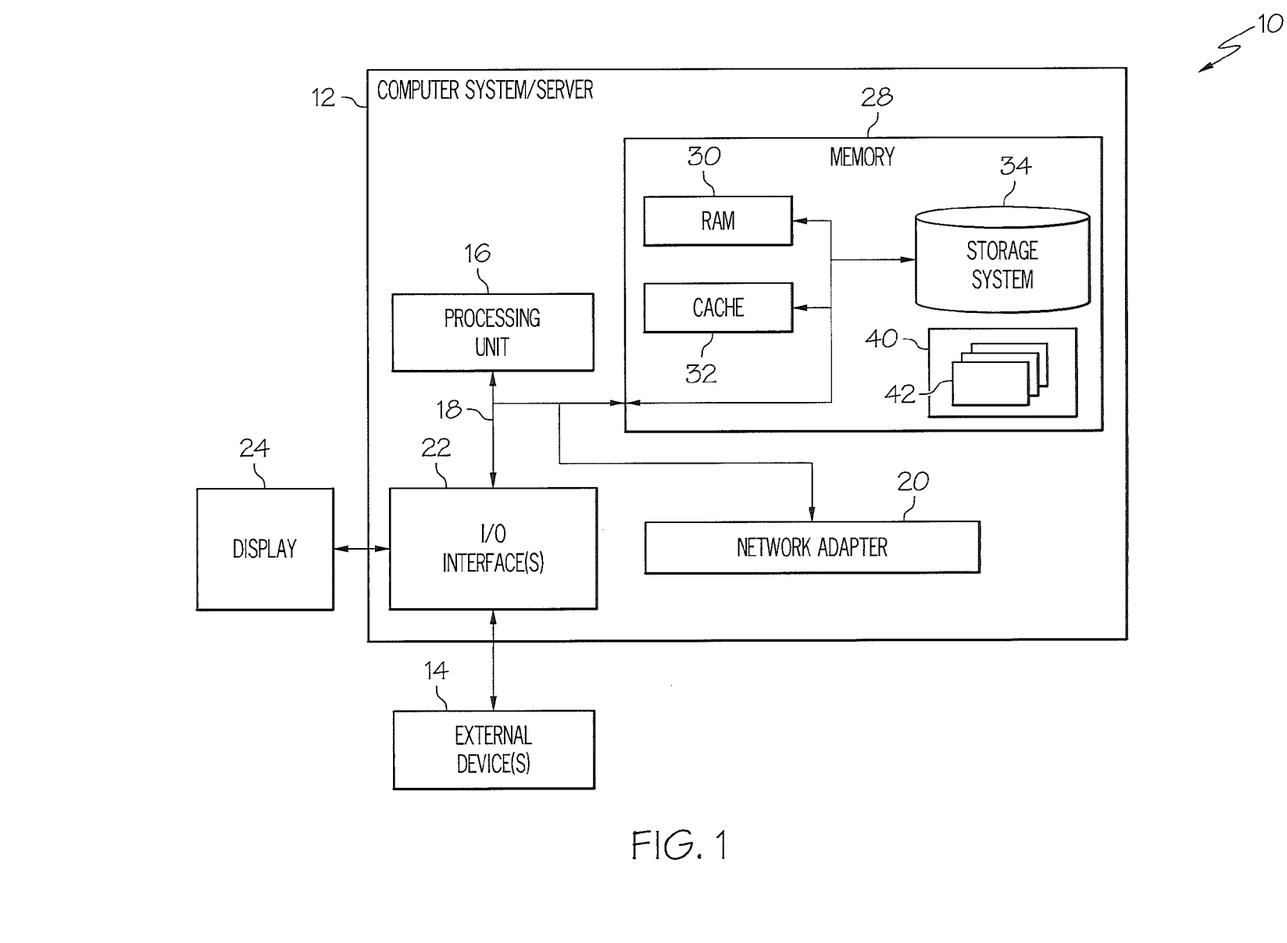
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth herein.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
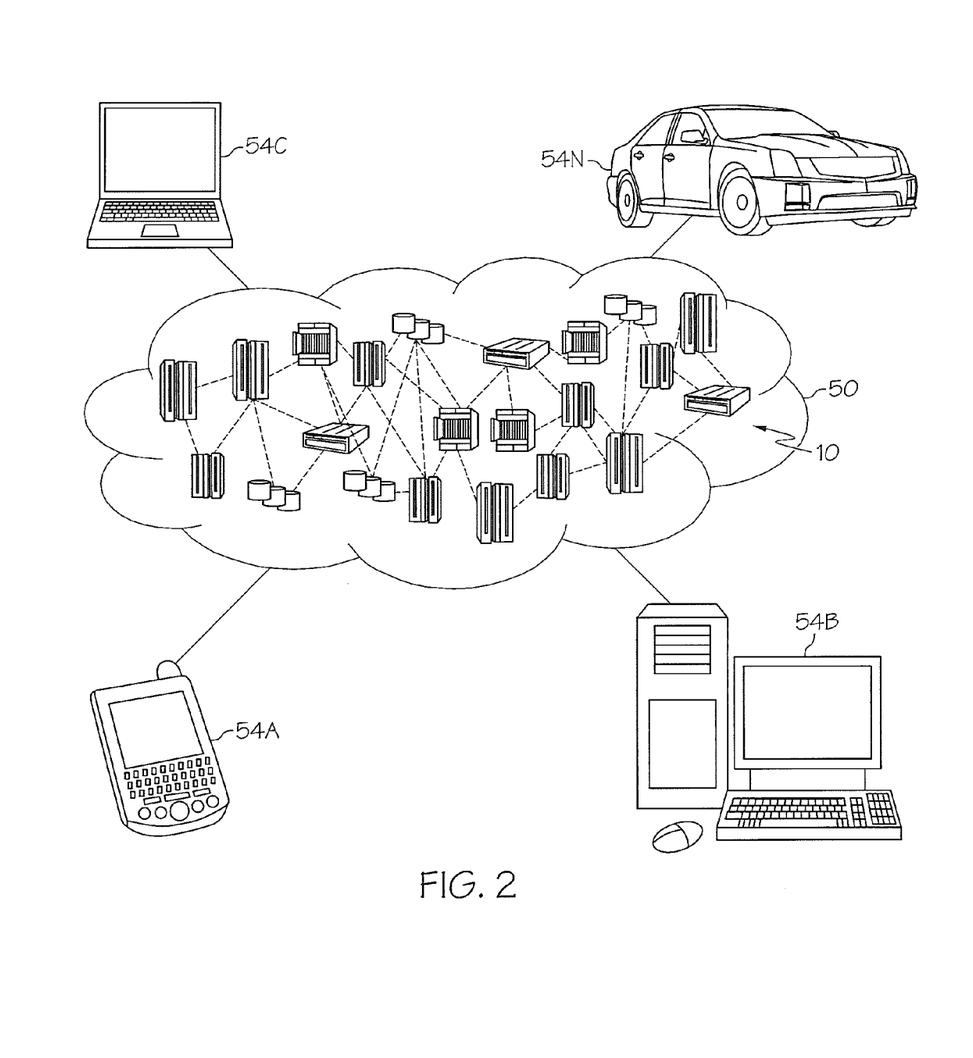
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
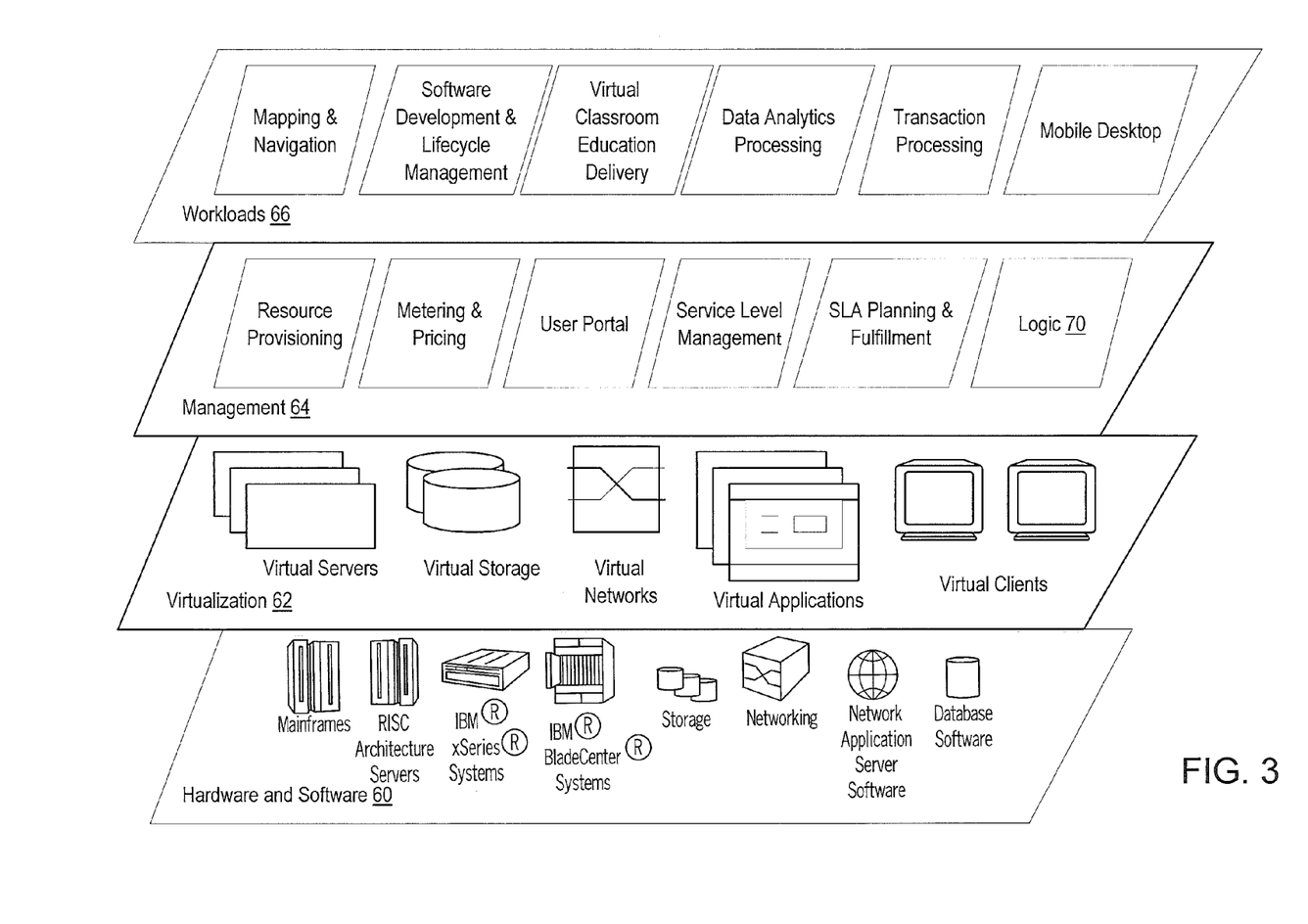
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one embodiment, one or both of the hardware and software layer 60 and the virtualization layer 62 may include edge components, such as a web server front end and image cache, as well as an image library store, e.g., in a high-performance RAID storage area network (SAN).

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security (not shown) provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. In an exemplary embodiment, logic 70 in the management layer 64 implements the exemplary resource management processes described herein. Alternatively, the logic 70 may be implemented as part of the Resource Provisioning functions of the management layer 64.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a mobile desktop for mobile devices (e.g., 54A, 54C, and 54N, as well as mobile nodes 10 in cloud computing environment 50) accessing the cloud computing services.

The logic 70 includes algorithms to implement embodiments described herein to provide resource management processes. In an embodiment, the logic 70 is coupled to and/or resides in the memory 28 shown in FIG. 1. In addition, embodiments of the logic 70 include one or more program modules 42 of the program/utility 40 shown in FIG. 1. In a further embodiment, the logic 70 is part of the management layer 64 and may be executed on hardware located in the hardware and software layer 60. However, it is understood that virtualized instances running on the system may be implemented in the virtualization layer 62.

As indicated above, the resource management processes consider the state of an end user implementing an application in the management of storage (e.g., reservation of resources). In conventional systems, resource reservation typically involves allocating an equal percentage of available resources to each end user (e.g., if RAM storage is 100 MB and there are 10 active end users, the system reserves 10 MB of storage to each end user). However, due to various reasons, the resources needed by each end user may differ. For example, suppose one end user is very active and the end user's device is prefetching data at a very fast rate. In conventional systems, the speed at which the prefetching occurs is limited to the amount of reserved RAM space allocated by the system. This principle also applies in reverse to instances where a user is very inactive. However, by factoring in several variables when determining allocation of resources among the end users, the exemplary resource management processes are capable of adjusting resource allocation for each end user based on real-time data.

The resource management processes build a high performance computing environment by effectively managing storage at a host system or server side of a network based on the state of the end users devices (e.g., client systems) implementing an application, such that it determines activeness of end users based on information acquired from the application logic and determine future I/O requirements for the end users.

A storage management process involves changing user resource reservations in each storage tier, migrating data required for active end users from lower tiers to higher tiers, and migrating data required for less active end users from high performance tiers to lower performance tiers. In a gaming embodiment, for example, if players are playing within a group or playing with dependent gamers (e.g., team players), the status of the group and/or dependent players is also considered. In addition, if the same server is used for hosting multiple applications, based on the overall performance of end users in each application, the storage resources for those applications can be managed.

Figure 4:
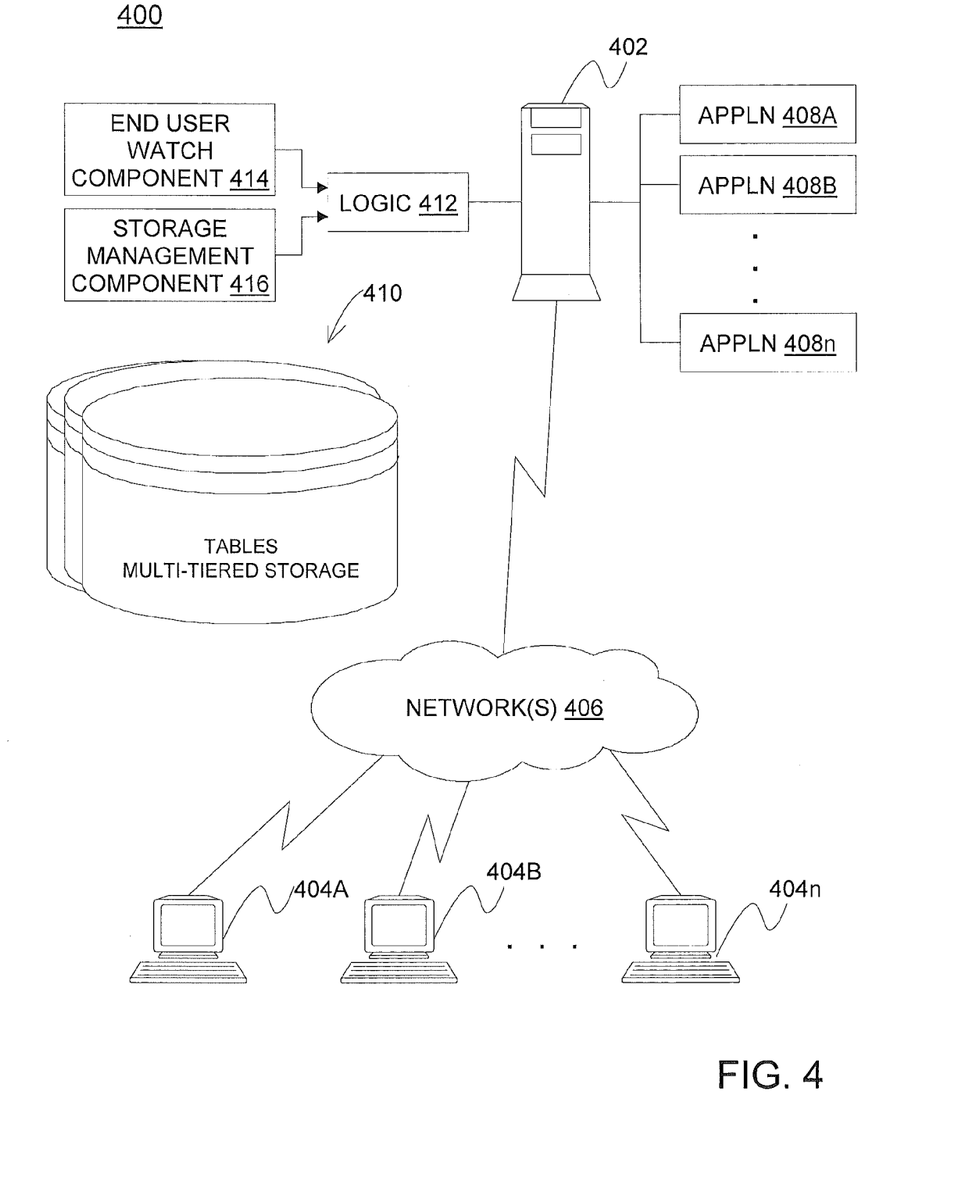
FIG. 4 depicts a client-server system according to an embodiment of the present invention.

A detailed embodiment of a system 400 upon which the resource management processes may be implemented will now be described with reference to FIG. 4. The system 400 of FIG. 4 includes a host system computer 402 and end user devices 404 communicatively coupled to one or more network(s) 406. The host system computer 402 may be implemented as one or more high-speed computer processing devices, such as one or more mainframe computers or servers capable of handling a high volume of computing activities conducted by end users of the exemplary resource management processes. The host system computer 402 may operate as a database server and coordinate access to application data including data stored on storage devices 410. The host system computer 402 may be implemented using one or more servers operating in response to a computer program stored in a storage medium accessible by the server. The host system computer 402 may operate as a network server (e.g., a web server) to communicate with the end user devices 404A-404n, as well as any other network entities. In an embodiment, the host system computer 402 may represent a node 10 in the cloud computing environment 50 (FIGS. 1-2) or may be configured to operate in a client/server architecture.

The end user devices 404A-404n may be any type of device with computer processing capabilities. For example, the end user systems 404A-404n may include a combination of general-purpose computers (e.g., desktop, lap top), host-attached terminals (e.g., thin clients), portable communication devices (e.g., smart phones, personal digital assistants, and tablet PCs). The end user devices 404A-404n may be wired or wireless devices. In an embodiment, the end user devices 404A-404n may represent cloud consumers 54A-54n (FIGS. 1-2).

In an embodiment, the end user devices 404A-404n may be implemented by end users of an entity, such as an organization or enterprise operating the host system computer 402. The end user devices 404A-404n may each execute a web browser for accessing network entities, such as the host system computer 402. In an embodiment, the end user devices 404A-404n access a web site of the host system computer 102 for browsing and accessing applications 408A-408n. In one embodiment, the applications 408A-408n may include business-directed applications, such as word processing, spreadsheet applications, and communications applications, etc. In this embodiment, the end user devices 404A-404n may be employees of an enterprise or organization or authorized users of systems of the enterprise. In another embodiment, the applications 404A-408n may include gaming applications and the end user devices 404A-404n are operated by consumers of gaming services provided by the host system computer 402.

In an embodiment, the logic 412 identifies each application 408A-408n by type. This identification may be implemented using various techniques. For example, applications that typically utilize fewer resources (e.g., perform few or predictable operations) may be identified as one type, while applications that typically utilize greater resources (e.g., many gaming applications in which high-speed graphics and dynamically changing scenes) may be identified as another type. The types assigned to the applications may be implemented as a static numerical value, for example, on a scale spanning the least resource intensive applications to the most resource intensive applications. In an embodiment, the logic 412 utilizes the application type in determining resource allocation as will be described herein.

The network(s) 106 may be any type of known networks including, but not limited to, a wide area network (WAN), a local area network (LAN), a global network (e.g. Internet), a virtual private network (VPN), and an intranet. The network(s) 106 may be implemented using a wireless network or any kind of physical network implementation known in the art, e.g., using cellular, satellite, and/or terrestrial network technologies.

The host system computer 402 executes logic 412 for implementing the resource management processes described herein. The logic 412 includes an end user watch component 414 and a storage management component 416, as will be described further herein. In an embodiment, the logic 412 represents the logic 70 described in FIG. 1, and the end user watch component 414 and storage management component 416 represent the program modules 42 of FIG. 1.

The system 400 also includes storage devices 410 communicatively coupled to the host system computer 402 in a multi-tiered storage architecture. At least one of the storage devices 410 may be implemented using memory contained in the host system computer 402 (e.g., tier 0 storage), or each of the storage devices 410 may be a separate physical device. The storage devices 410 may be logically addressable as consolidated data sources across a distributed environment that includes a network (e.g., network(s) 406). In an embodiment, one or more of the storage devices stores tables used by the resource management processes described herein.

In one embodiment, the storage devices 410 are configured with tier 1 storage (e.g., solid state drive or disks (SSDs)), tier 2 storage (e.g., SATA RAID), and tier 3 storage (e.g., tape), while the host system 402 includes tier 0 storage (e.g., RAM). Each tier in the storage devices 410 may include heterogeneous devices of similar storage class, such as devices from different vendors, devices with different QoS parameters (e.g., durability, mean time between failures, etc.) Typically, the tier 1 devices are costlier than the tier 2 devices, and the tier 2 devices are costlier than the tier 3 devices, and a converse relationship applies to data performance in these tiers. The exemplary resource management processes is configured to store information for more active end users within the top tiers of the storage system.

Figure 5:
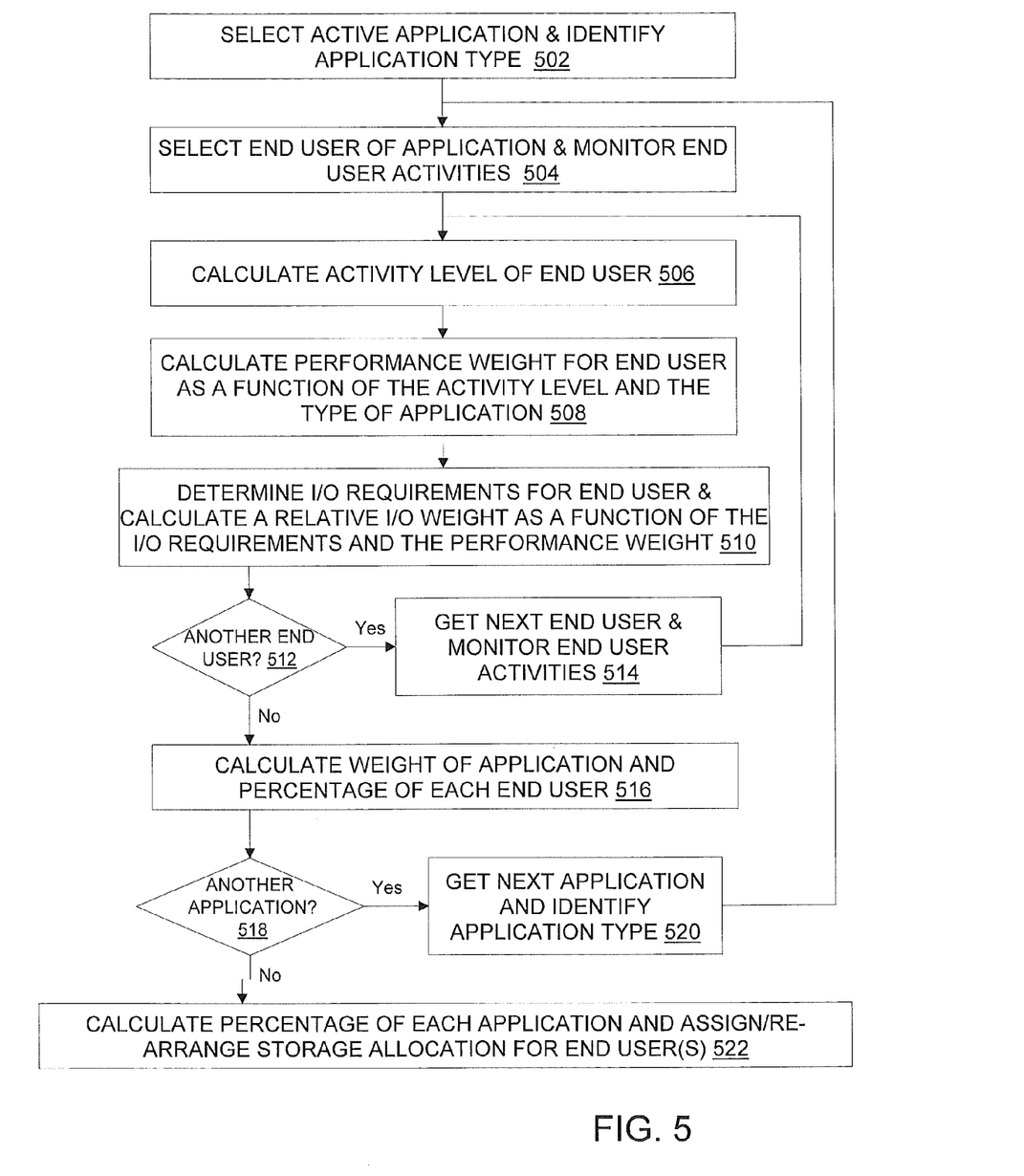
FIG. 5 depicts a flow diagram according to an embodiment of the present invention.
Figures 6A, 6B:
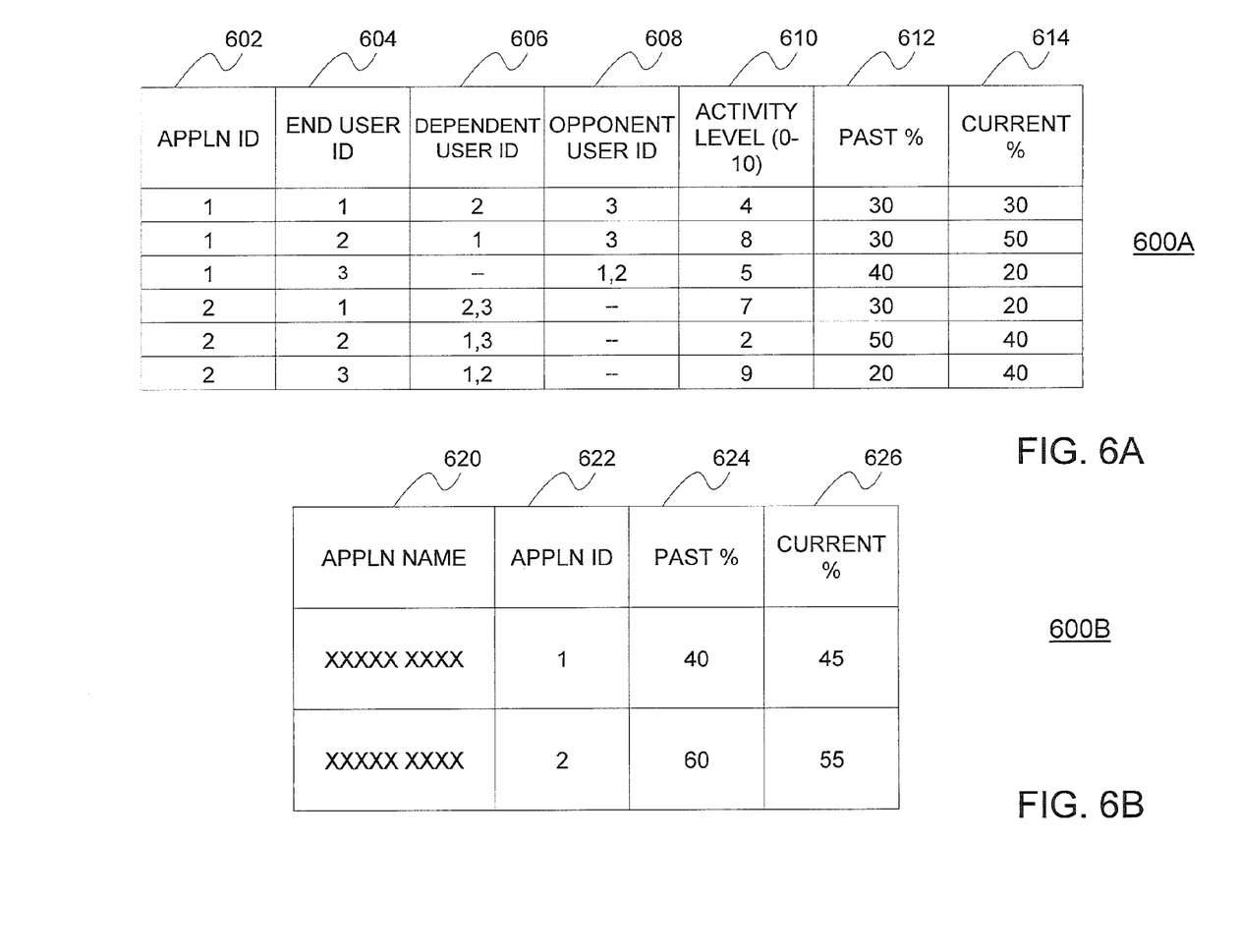
FIG. 6A and FIG. 6B each depict a table according to an embodiment of the present invention.

Turning now to FIG. 5, a flow diagram of a process for implementing the resource management processes will now be described in an embodiment. The logic 412 builds tables for active applications 408A-408n, as well as active end users, and uses these tables to document activities, data, and results of calculations performed, as described in FIGS. 5-7. Two of the tables are illustrated in FIGS. 6A-6B. As described herein, active applications refer to those that are currently accessed and executed by end users. Likewise, active end users refer to those ends user devices 404A-404n that are executing one or more applications 408A-408n. As shown in FIG. 6A, a table 600A includes a column 602 for identifying each active application and a column 604 for identifying each end user that is executing the application. If the application is a gaming application with multiple players, e.g., the table 600A includes a column 606 to identify each dependent player, and a column 608 to identify each opponent player. It is understood that the table 600A is dynamic, such that rows may be added or deleted whenever a new application is hosted, a new end user accesses a currently active application, or an end user finishes or quits an application.

While the processes of FIG. 5 is described as a sequence of steps, it will be understood that at least a portion of the processing performed with respect to each of the selected applications and end users may be performed simultaneously. In addition, the processes of FIG. 5 may be repeated on an intermittent basis or as often as desired by the host system computer 402.

At step 502, the end user watch component 414 of the logic 412 selects an active application (e.g., one of applications 408A-408n identified as "1" or "2" in the table 600A) and identifies the application type. As indicated above, the application type is assigned a value that indicates the level of resources typically required for, or otherwise associated with, the application. This application type value is represented in FIG. 6B as past and current percentages in respective columns 624 and 626.

At step 504, the end user watch component 414 selects an end user of the application (e.g., one of the end user devices 404A-404n identified as "1," "2," or "3") and monitors end user activities. The activities conducted by the end user and monitored by the end user watch component 414 include any key strokes, inputs, commands, etc., attributed to the end user device.

At step 506, the end user watch component 414 calculates an activity level of the end user. The activity level represents a value indicative of end user-specific activity that is unrelated to the application executed by the end user. For example, one end user who is new to a gaming application may be relatively slow in working through the scenes of the game, thereby requiring fewer resources, as compared to a more experienced gamer. The activity level may be manifested as a numeric value on a scale of values, e.g., 0-10, whereby '0' represents a least amount of activity and '10' represents a greatest amount of activity. The activity level, once calculated, is entered in a column 610 in the table 600A of FIG. 6.

At step 508, the end user watch component 414 calculates a performance weight for the end user as a function of the activity level and the type of application. The performance weight may be calculated using a formula:

Variable x*activity level, where 'x' represents a system-defined value based on the type of application.

Alternatively, if the application is a multi-player gaming application, the performance weight considers other players in the calculation. In this embodiment, the performance weight may be calculated using a formula:

A*performance weight of player+B*performance weight of dependent player−C*performance weight of opponent player, where 'A,' 'B,' and 'C' are system-defined values based on the type of game. These system-defined values may vary from game to game or among various game types.

In a multi-player game, e.g., it is understood that dependent players (e.g., teammates) may assist in increasing activities of the end user (e.g., in a cooperative team environment), while opponent players may serve to deter or decrease activities of the end user. This is reflected in the above-referenced formula.

At step 510, the end user watch component 414 determines input/output (I/O) requirements for the end user and calculates a relative I/O weight as a function of the I/O requirements and the performance weight. The I/O requirements may be calculated using application data including an application state that is analyzed by the logic 412. For example, if the end user is proceeding through an application and is near the end, the logic 412 identifies this 'application state' which indicates that the end user will require fewer resources or is otherwise 'winding down.' In a gaming environment, the logic 412 may determine from the application state that the end user is nearing the end of the game. Alternatively, in a gaming environment, the logic 412 determines from the application state that the end user is engaged in high intensity activities or multiple scene change events that require greater system resources. Thus, the logic 412 is configured to acquire not only end user-specific activity, but also application state information in determining I/O requirements for the end user. The I/O weight for an end user may be calculated using a formula:

I/O requirement of end user*performance weight of end user.

The I/O weight is entered in the table 600A in column 614 as a current percentage. Also, as shown in FIG. 6, a previously calculated I/O weight is provided in a column 612 of the table 600A, which is described further herein.

At step 512, the end user watch component 414 determines whether other end users are active with respect to the application. If so, the end user watch component 414 accesses the next end user and monitors the end user activities at step 514, and the process returns to step 506. As indicated above, at least a portion of the steps associated with the end users for an active application may be processed in a simultaneous fashion.

Otherwise, if no other end users are active, the end user watch component 414 calculates an input/output weight of the application and a percentage of each of the end users at step 516. The input/output weight of the application may be used in calculating an amount of resources to allocate for each application when multiple applications are active. The input/output weight of the application may be calculated using a formula:

Sum of I/O weight of all active end users.

The percentage of the end user may be calculated using a formula:

I/O weight of end user/input/output weight of the application.

At step 518, the end user watch component 414 determines whether any other applications are active. If so, the end user watch component 414 accesses the next application and identifies the application type at step 520, and the process returns to step 504. As indicated above, at least a portion of the steps associated with the active applications may be processed in a simultaneous fashion.

Otherwise, if no other applications are active, the end user watch component 414 calculates a percentage of each application and assigns or re-arranges storage allocation for the end users based on the weights at step 522. The percentage of each application may be calculated using a formula:

Input/output weight of application/sum of input/output weights of all applications active on computer (e.g., host system computer 402).

As shown in FIG. 6B, table 600B illustrates application-level information for each application hosted by the host system computer 402. An application name is stored in a column 620 and an application identification is stored in a column 622. Storage resources are assigned or re-adjusted for end users of an application, as well as among applications, based on the calculated percentage values.

The storage management component 416 manages storage resources for the end users as per the I/O weight value for each storage resource. For example at the SSD tier, if the storage management component 416 is allocating 20 GB of SSD space out of 40 GB for an application, based on the calculated I/O weight value of the end users, 20 GB of SSD space is distributed among the active end users. A detailed process for assigning and/or re-arranging storage allocation (step 522) will now be described in FIG. 7.

Figure 7:
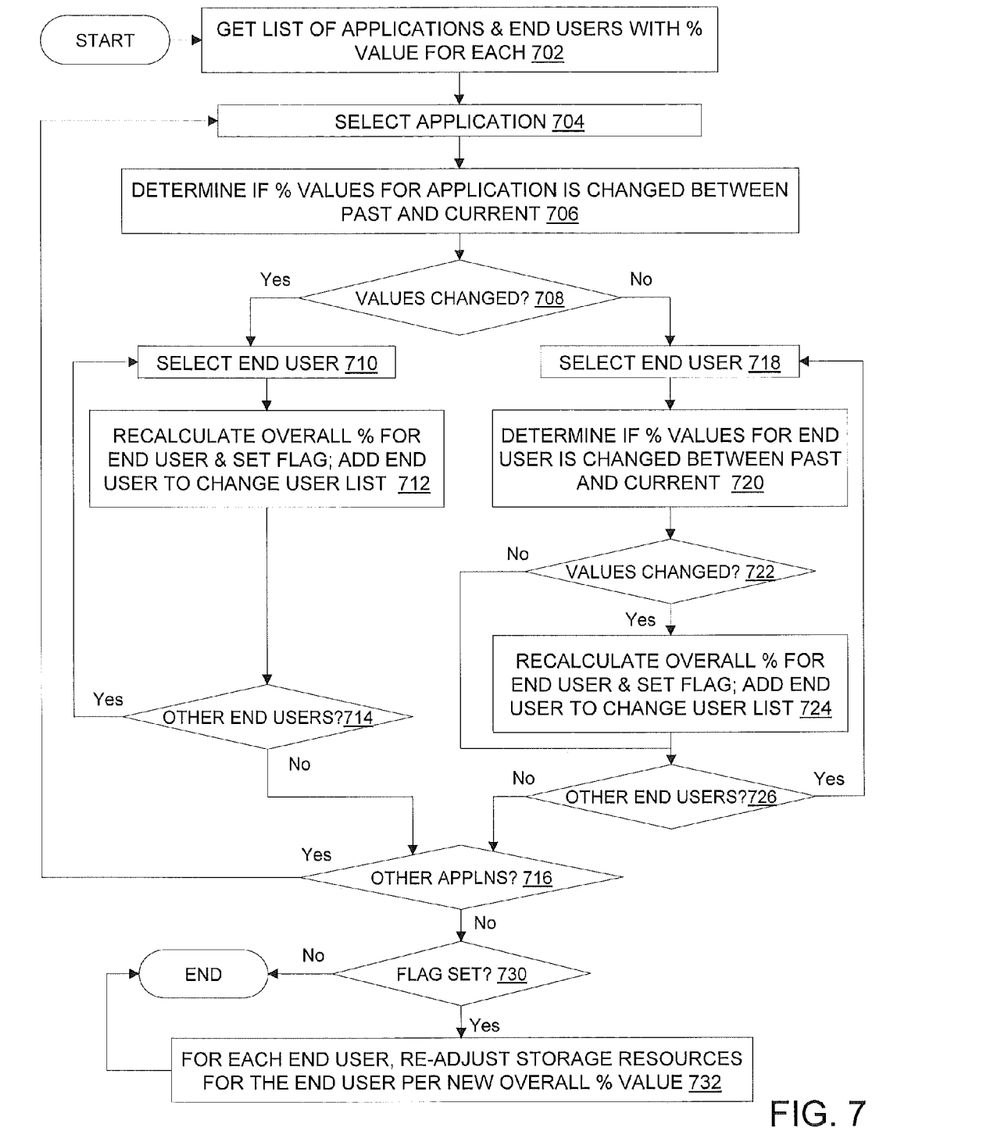
FIG. 7 depicts a flow diagram according to an embodiment of the present invention.

The process begins whereby the storage management component 416 of the logic 412 accesses a list of applications and end users with a percentage value for each at step 702.

At step 704, the storage management component 416 selects one of the applications.

At step 706, the storage management component 416 determines if percentage values for the application has changed between past and current values. This determination is implemented by comparing values between columns 624 and 626 of table 600B. If the percentage values have changed, the storage management component 416 selects an end user at step 710, and recalculates the overall percentage for the end user, followed by setting a flag at step 712. The end user is added to a change user list. The flag and the change user list may be temporary constructs of the logic 412 that are used during processing and deleted once the processing has completed. For example, the flag is set where the logic 412 determines there is some change in user activity levels. The change user list may include a list of users whose activity levels have changed.

At step 714, the storage management component 416 determines whether there are any other end users. If so, the process returns to step 710 and another end user is selected.

Otherwise, if no other end user is identified, the storage management component 416 determines whether any other applications are present in the list (from step 702) at step 716. If other applications are present in the list, the storage management component 416 returns to step 704.

Turning back to step 708, if the end user watch component 414 determines that the percentage values 'past' and 'current' in columns 624 and 626, respectively, have not changed, the storage management component 416 selects the end user at step 718.

At step 720, the storage management component 416 determines whether the percentage values for the end user have changed between past and current (from respective columns 612 and 614 of table 600A).

At step 722, if the values have changed, the storage management component 416 recalculates the overall percentage for the end user and sets the flag at step 724. The storage management component 416 adds the end user to the change user list at step 724. If the values have not changed at step 722, the storage management component 416 determines whether there are any other end users at step 726. If so, the process returns to step 718 and the storage management component 416 selects the next end user.

If however, there are no other end users at step 726, or alternatively there are no other end users from step 714, the storage management component 416 checks to see if the flag has been set at step 730. If so, the storage management component 416 re-adjusts the storage resources for each of the end users based on the new overall percentage value at step 732, and the process ends. If however, the flag has not been set, the process ends as no resource changes are needed.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A system, comprising:
a multi-tiered storage system; and
a processor communicatively coupled to the multi-tiered storage system, the processor configured to execute computer readable instructions, the computer readable instructions including:
calculating a performance weight for each end user of an application, the performance weight calculated as a function of a current activity level of each end user with respect to activities conducted via the application and a type of the application, the application typed with a static value that indicates an average amount of storage resources in the multi-tiered storage system used by the application;
calculating an input/output weight for each end user from a combination of an input/output requirement and the performance weight, the input/output requirement indicative of an amount of storage resources of the multi-tiered storage system associated with anticipated activities of the end user; and
allocating an amount of the storage resources for each end user that is proportioned based on the corresponding input/output weight;
wherein the performance weight is calculated as a product of a value representing the current activity level times the static value.

2. The system of claim 1, wherein the computer readable instructions further include:
determining the current activity level from inputs received by the end user with respect to executing the application.

3. The system of claim 1, wherein the application is a game, wherein the computer readable instructions further include:
adjusting the performance weight when the end user is cooperatively engaged in the game with a second end user and when the end user is engaged in the game with a third end user operating as an opponent of the end user.

4. The system of claim 1, wherein the anticipated activities of the end user are with respect to a particular function that is defined by a current location in the application, the input/output requirement varying throughout the application.

5. The system of claim 1, wherein the processor executes a second application simultaneously with the application, wherein the computer readable instructions further include:
calculating an input/output weight of the application, the input/output weight of the application calculated as a summation of the input/output weight of each end user of the application; and
calculating an input/output weight of the second application, the input/output weight of the second application calculated as a summation of input/output weights of each end user of the second application;
wherein the allocating an amount of the storage resources for each end user that is proportioned based on the corresponding input/output weight further includes assigning an amount of the storage resources to each of the application and the second application based on the input/output weight of the application and the input/output weight of the second application.

6. The system of claim 1, wherein allocating an amount of the storage resources includes assigning a proportionately greater amount of the storage resources to the end user determined to have an input/output weight that is greater than an input/output weight of another end user.

7. The system of claim 1, wherein the logic is provided as a service in a cloud computing environment.

8. The system of claim 1, wherein the allocating an amount of storage for each end user that is proportioned based on the corresponding input/output weight includes migrating data required for select end users who are determined to be active, as defined by the corresponding input/output weight, from lower performance tiers to higher performance tiers in the multi-tiered storage system, and migrating data required end users who are determined to be less active, as defined by the corresponding input/output weight, from higher performance tiers to lower performance tiers in the multi-tiered storage system.

9. The system of claim 1, wherein the input/output requirement indicates a value that varies throughout execution of the application.

10. The system of claim 1, wherein the anticipated activities of the end user are with respect to a particular function that is defined by a current location in the application.

* * * * *